United States Patent
Eno et al.

(10) Patent No.: US 10,762,660 B2
(45) Date of Patent: Sep. 1, 2020

(54) METHODS AND SYSTEMS FOR DETECTING AND ASSIGNING ATTRIBUTES TO OBJECTS OF INTEREST IN GEOSPATIAL IMAGERY

(71) Applicant: Verizon Patent and Licensing Inc., Arlington, VA (US)

(72) Inventors: Joshua Eno, Denver, CO (US); Lindy Williams, Broomfield, CO (US); Wesley Boyer, Denver, CO (US); Kevin Brackney, Westminster, CO (US); Bergen Davell, Wheat Ridge, CO (US); Khoa Truong Pham, Centennial, CO (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 68 days.

(21) Appl. No.: 16/147,491

(22) Filed: Sep. 28, 2018

(65) Prior Publication Data

US 2020/0105009 A1 Apr. 2, 2020

(51) Int. Cl.
*G06T 7/70* (2017.01)
*G06T 7/00* (2017.01)
*G06T 7/11* (2017.01)

(52) U.S. Cl.
CPC ............. *G06T 7/70* (2017.01); *G06T 7/0002* (2013.01); *G06T 7/11* (2017.01); *G06T 7/97* (2017.01)

(58) Field of Classification Search
CPC combination set(s) only.
See application file for complete search history.

(56) References Cited

U.S. PATENT DOCUMENTS

| | | | | |
|---|---|---|---|---|
| 2008/0089577 | A1* | 4/2008 | Wang | G06T 7/593 382/154 |
| 2009/0010493 | A1* | 1/2009 | Gornick | G06T 7/70 382/103 |
| 2011/0141287 | A1* | 6/2011 | Dunkel | G06T 7/20 348/169 |
| 2013/0300740 | A1* | 11/2013 | Snyder | G06F 3/016 345/420 |

* cited by examiner

*Primary Examiner* — Tsung Yin Tsai

(57) ABSTRACT

Exemplary systems and methods perform post-processing operations on computer vision model detections of objects of interest in geospatial imagery to detect and assign attributes to the detected objects of interest. For example, an exemplary post-processing system correlates multiple detections, made by a computer vision model, of an object of interest depicted within a set of images of a geospatial location, determines, based on the correlated detections, an attribute of the object of interest depicted within the set of images of the geospatial location, and selects the attribute for inclusion in a dataset for the object of interest. Corresponding methods and systems are also disclosed.

20 Claims, 9 Drawing Sheets

METHODS AND SYSTEMS FOR DETECTING AND ASSIGNING ATTRIBUTES TO OBJECTS OF INTEREST IN GEOSPATIAL IMAGERY

BACKGROUND INFORMATION

Computer vision technologies are useful for identifying objects of interest depicted in geospatial imagery such as satellite, street-level, and community-sourced images of real-world geospatial locations. However, state-of-the-art computer vision technologies are not completely accurate in identifying objects of interest, which introduces a level of error and uncertainty that is difficult to correct. For example, state-of-the-art computer vision technologies mis-identify some objects as objects of interest (i.e., false positive identifications), fail to identify some actual objects of interest (i.e., false negative identifications), mis-identify boundaries of detected objects of interest, and/or mis-identify attributes of detected objects of interest.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Methods and systems for detecting and assigning attributes to objects of interest in geospatial imagery are described herein. For example, a post-processing system may perform one or more post-processing operations on outputs from one or more computer vision models to detect and assign attributes to objects of interest depicted in geospatial imagery. As one example, the post-processing system may correlate, based on geospatial data associated with a set of images of a geospatial location, multiple detections, made by a computer vision model, of an object of interest depicted within the set of images of the geospatial location. Based on the correlated detections, the post-processing system may determine an attribute of the object of interest depicted within the set of images of the geospatial location and select the determined attribute of the object of interest for inclusion in a dataset for the object of interest.

Methods and systems described herein for detecting and assigning attributes to objects of interest in geospatial imagery provide various advantages, benefits, and improvements in comparison to conventional computer vision models. In particular, by performing one or more post-processing operations on outputs of a computer vision model as described herein, a post-processing system may detect and assign attributes to an object of interest in a manner that filters out false detections and/or verifies true detections. The post-processing operation(s) may filter out false detections by correlating multiple detections of the object of interest across a set of images and using the correlated detections to identify anomalous attributes and/or detections indicative of potentially false or inconsistent detections of the object of interest. The post-processing operation(s) may verify true detections by associating consistent detections across the set of images. For example, a positive detection of the object of interest in one image may be associated with other positive detections of the object of interest in other images to identify consistencies indicative of potentially true detections of the object of interest. In this or a similar manner, methods and systems described herein may utilize one or more post-processing operations described herein to improve the accuracy of determined attributes of object of interests depicted in geospatial imagery.

Various embodiments will now be described in more detail with reference to the figures. The disclosed systems and methods may provide one or more of the benefits mentioned above and/or various additional and/or alternative benefits that will be made apparent herein.

Figure 1:
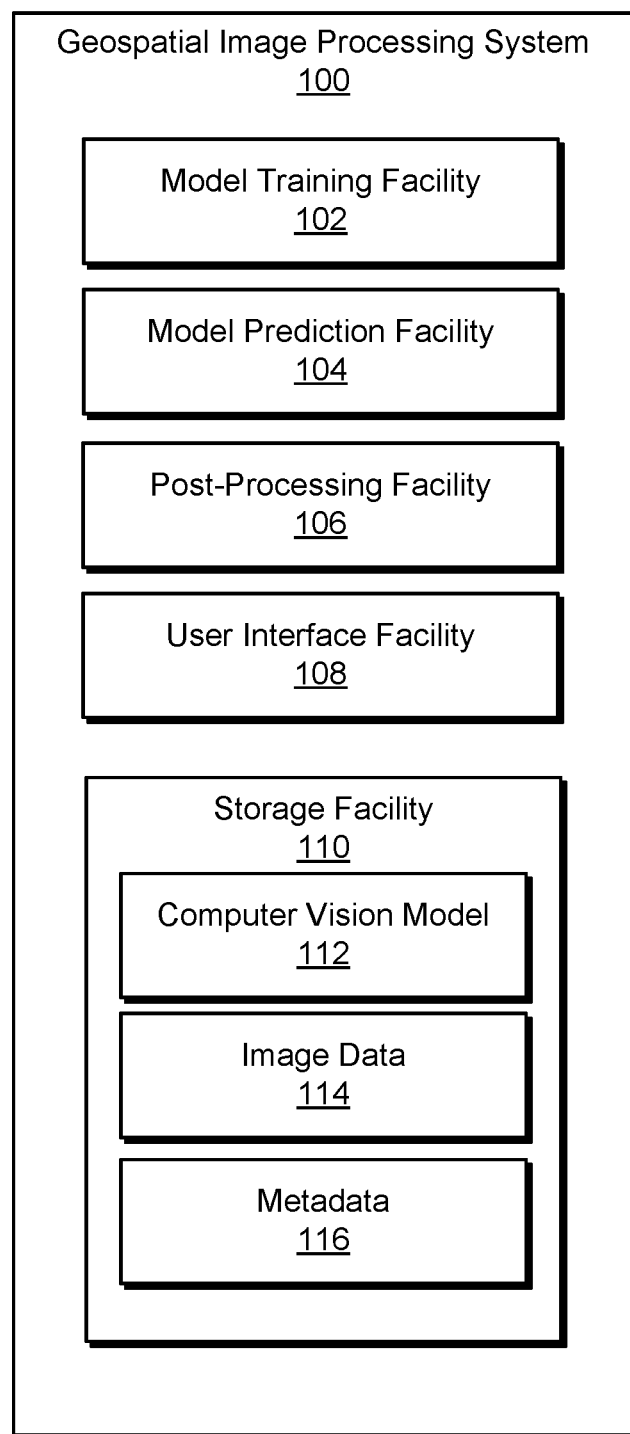
FIG. 1 illustrates an exemplary geospatial image processing system according to principles described herein.

FIG. 1 illustrates an exemplary geospatial image processing system 100 ("system 100"). As shown, system 100 may include, without limitation, a model training facility 102, a model prediction facility 104, a post-processing facility 106, a user interface facility 108, and a storage facility 110 selectively and communicatively coupled to one another. It will be recognized that although facilities 102 through 110 are shown to be separate facilities in FIG. 1, facilities 102 through 110 may be combined into fewer facilities, such as into a single facility, or divided into more facilities as may serve a particular implementation. In some examples, facilities 102 through 110 may be distributed between multiple devices and/or multiple locations as may serve a particular implementation. Additionally, one or more of facilities 102 through 110 may be omitted from system 100 in certain implementations, while additional facilities may be included within system 100 in the same or other implementations.

Each of facilities 102 through 110 may include or be implemented by one or more physical computing devices such as hardware and/or software components (e.g., processors, memories, communication interfaces, instructions stored in memory for execution by the processors, etc.). For instance, the facilities may be implemented using separate computing components unique to each facility or may be implemented using shared computing components. Each of facilities 102 through 110 will now be described in more detail.

Storage facility 110 may store and maintain any data used by facilities 102 through 108 (and/or any other facilities included within system 100 not explicitly shown) to perform any of the operations described herein. For example, storage facility 110 may include program instructions for performing the operations described herein, as well as data received, generated, managed, maintained, used, and/or transmitted by facilities 102 through 108 as may serve a particular implementation. In some examples, for instance, storage facility 110 may include data representative of a computer vision model 112, image data 114 representing a set of images, and metadata 116 associated with the images.

Computer vision model 112 may include any type or implementation of a machine learning computer vision model for detecting one or more objects of interest in geospatial imagery. For instance, the computer vision model may include a neural network having an input layer, any suitable number of hidden layers, and an output layer. The neural network may be a convolutional neural network, a residual convolutional neural network, or any other suitable neural network. In other implementations, computer vision model 112 may include any other suitable machine learning model configured or configurable to detect one or more objects of interest in geospatial imagery.

Computer vision model 112 may be trained to detect depictions of any suitable object or objects of interest in geospatial imagery. Examples of such objects of interest include, but are not limited to, traffic lights, street signs, crosswalks, buildings, trees, vehicle parking spaces, parking meters, business signs, building addresses, doorways, handicap ramps, billboards, and poles (e.g., street-lamp poles, utility poles, decorative poles, etc.).

Image data 114 may represent geospatial imagery, which may include one or more images of a real-world geospatial location. A real-world geospatial location may include any real-world space associated with a geographic location. Images of the geospatial location may include satellite view images, street-level images, and/or any other image views of the geospatial location. For example, a set of images of a geospatial location may include one or more satellite images of the geospatial location and/or one or more street-level images of the geospatial location. A set of street-level images of the geospatial location may include images captured from different camera viewpoints relative to the geospatial location (e.g., different camera viewpoints having different camera locations and/or orientations).

Metadata 116 may include any information associated with geospatial imagery represented by image data 114. For example, metadata 116 may specify information about camera location and orientation from which geospatial imagery is captured and/or information about times at which geospatial imagery is captured. Metadata 116 may further include information descriptive of computer vision model detections of objects of interest in geospatial imagery, such as information specifying pixel locations of detections in images, geospatial positions of detections, confidence levels of detections, attributes of detected objects of interest (e.g., height, width, distance from camera, material of composition, classification, etc. for a detected object of interest), and/or any other information associated with detected objects of interest. Metadata 116 may further include data representative of user tags associated with images, such as tags applied to images for training and/or validating computer vision model 112. Metadata 116 may further include data representative of user validations of computer vision model detections of objects of interest in geospatial imagery.

Information included in metadata 116 that indicates geospatial information about geospatial imagery, such as geospatial information about an image, a camera that captured an image (e.g., a geospatial position, orientation, and/or other properties of the camera when the camera captured the image), and a detection of an object of interest in an image (e.g., a pixel position or geospatial position of the detection), may be referred to as geospatial data for the geospatial imagery. Geospatial data for the geospatial imagery may also include information about geospatial imagery from which geospatial information about the geospatial imagery may be derived.

Model training facility 102 may be configured to train a computer vision model, such as computer vision model 112, to detect depictions of an object of interest in geospatial imagery. For example, model training facility 102 may execute a training session to train a computer vision model capable of machine learning. The training session may be performed in any suitable way, including by model training facility 102 submitting one or more sets of training images to the computer vision model for supervised machine learning by the computer vision model, such that the computer vision model learns to detect one or more objects of interest depicted in geospatial imagery. To illustrate, model training facility 102 may submit, to the computer vision model, a set of geospatial images in which depictions of an object of interest such as a traffic light have been tagged. The computer vision model may use the set of geospatial images to learn features associated with tagged depictions of objects and to configure the computer vision model to detect such features in order to identify traffic lights in other geospatial imagery.

Model training facility 102 may be configured to train a machine learning computer vision model in any suitable way. For example, model training facility 102 may train the computer vision model starting from scratch using tagged training images and/or may further train the computer vision model using additional training images. In some examples, transfer learning may be used to train the computer vision model such as by initially training the model on a public dataset and then performing further training on annotated geospatial imagery that matches or is similar to geospatial imagery that the model will be used on.

Model prediction facility 104 may be configured to execute runtime operation of a computer vision model, such as computer vision model 112, to detect depictions of an object of interest in geospatial imagery. For example, model prediction facility 102 may submit a set of geospatial images to the computer vision model, which may process the geospatial images to detect depictions of the object on interest in the geospatial images. If the computer vision model has been trained to detect depictions of traffic lights, for instance, the computer vision model may process the set of geospatial images to detect depictions of traffic lights in the images. The computer vision model may detect objects of interest depicted in the geospatial images in any suitable way and using any suitable form of geospatial images as input to the computer vision model. For example, the set of geospatial images submitted to the computer vision model may include full images or portions of images that have been identified, by a pre-processing operation, as segments of images that are of interest (e.g., slices of images that may include objects of interest). In other examples, the input to the computer vision model may be in other suitable forms, such as feature vectors indicating features of geospatial images or portions of geospatial images.

The computer vision model may output data representative of detections of objects of interest depicted in the geospatial images. The output may be in any suitable form, including candidate detections and confidence scores respectively associated with the candidate detections. The output may indicate one or more attributes of the detected objects of interest, such as sizes (e.g., heights and/or widths), classes (e.g., street lights, poles, etc.), and/or materials of composition (e.g., wood, metal, etc.) of the detected objects of interest.

Post-processing facility 106 may be configured to perform one or more post-processing operations on the outputs of the computer vision model to detect and assign attributes to objects of interest detected by the computer vision model, which post-processing operations may include filtering out false detections and/or verifying true detections. For example, post-processing facility 106 may correlate multiple detections, made by the computer vision model, of an object of interest depicted within a set of images of a geospatial location and use the correlated detections to determine an attribute of the object of interest depicted within the set of images of the geospatial location and select the attribute for inclusion in a dataset for the object of interest. Examples of post-processing operations that may be performed by post-processing facility 106 are described in detail herein.

User interface facility 108 may be configured to provide a user interface configured to facilitate training and/or validating a computer vision model such as computer vision model 112. The user interface may be accessible by way of a user computing device such that a user of the user computing device may interact with system 100 by way of the user interface. The interactions may include the user receiving user interface content and providing user input that may be used by system 100 to train and/or validate the computer vision model. To this end, user interface facility 108 may generate user interface content for presentation in the user interface, such as user interface content configured to be displayed in one or more graphical user interface views of the user interface. User interface facility 108 may further provide one or more user interface tools configured to facilitate reception of user input for training and/or validating the computer vision model.

After the computer vision model has been trained, model prediction facility 104 may execute runtime operation of the trained computer vision model to detect depictions of an object of interest in geospatial imagery. For example, model prediction facility 104 may submit geospatial imagery to the trained computer vision model, which may process the geospatial imagery to detect depictions of the object of interest in the geospatial imagery. In this or a similar manner, model prediction facility 104 may provide detections of one or more objects of interest in geospatial imagery of a geospatial location.

Post-processing facility 106 may receive and process detections of one or more objects of interest provided by model prediction facility 104. The processing may include post-processing facility 106 correlating multiple detections of an object of interest and using the correlated detections to determine and assign one or more attributes for the detected object of interest.

Figure 2:
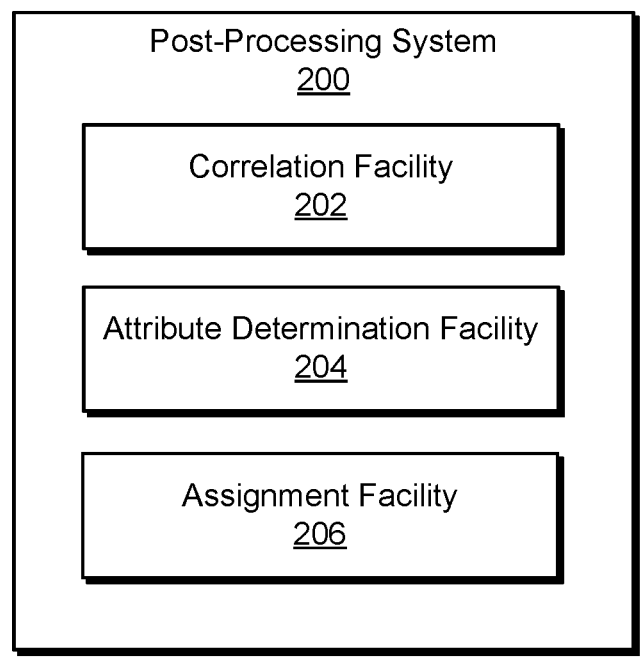
FIG. 2 illustrates an exemplary post-processing system according to principles described herein.

FIG. 2 illustrates an exemplary post-processing system 200. In certain examples, post-processing system 200 may be implemented as post-processing facility 106 in system 100. As shown, post-processing system 200 may include, without limitation, a correlation facility 202, an attribute determination facility 204, and an assignment facility 206 selectively and communicatively coupled to one another. It will be recognized that although facilities 202 through 206 are shown to be separate facilities in FIG. 2, facilities 202 through 206 may be combined into fewer facilities, such as into a single facility, or divided into more facilities as may serve a particular implementation. In some examples, facilities 202 through 206 may be distributed between multiple devices and/or multiple locations as may serve a particular implementation. Additionally, one or more of facilities 202 through 206 may be omitted from post-processing system 200 in certain implementations, while additional facilities may be included within post-processing system 200 in the same or other implementations.

Each of the facilities 202 through 206 may include or be implemented by one or more physical computing devices such as hardware and/or software components (e.g., processors, memories, communication interfaces, instructions stored in memory for execution by the processors, etc.). For instance, the facilities may be implemented using separate computing components unique to each facility or may be implemented using shared computing components. Each of the facilities 202 through 206 will now be described in more detail.

Correlation facility 202 may be configured to perform one or more post-processing operations to correlate, across multiple geospatial images of a geospatial location, detections of an object of interest made by a computer vision model in the geospatial images of the geospatial location. The correlation may include correlation facility 202 identifying detections of potentially the same instance of an object of interest in the geospatial images of the geospatial location. For example, correlation facility 202 may use geospatial data associated with the geospatial images of the geospatial location to identify multiple detections that intersect at a geospatial intersection. In certain examples, correlation facility 202 may identify multiple detections that intersect at a geospatial intersection by performing one or more triangulation operations to determine that the geospatial intersection corresponds to each of the multiple detections. Correlation facility 202 may select the identified multiple detections for inclusion in a correlated set of detections based on the multiple detections intersecting at the same geospatial intersection. Such a correlated set of detections may be referred to as "correlated detections" or "a set of correlated detections."

Figure 3:
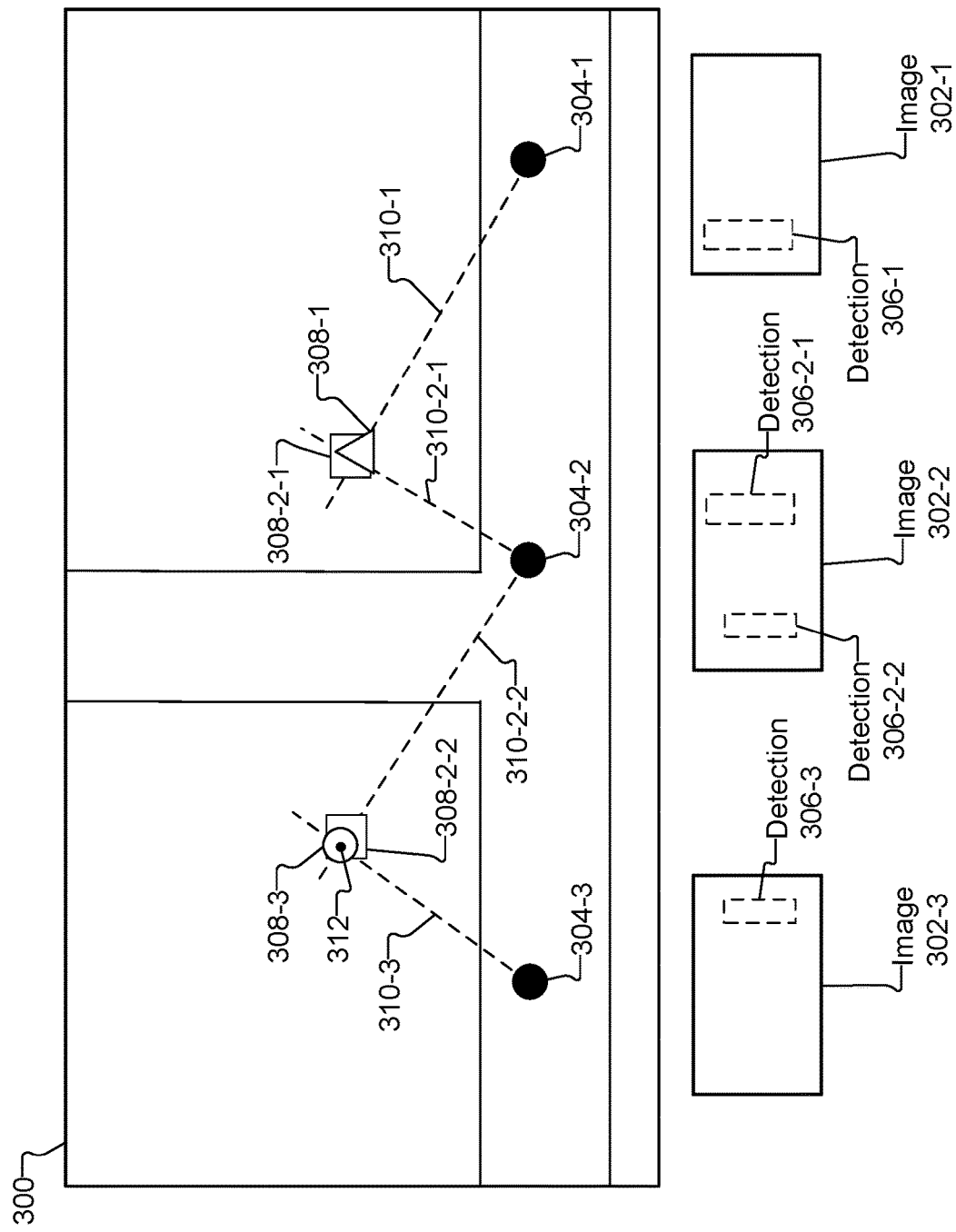
FIG. 3 illustrates an example of correlating detections of an object of interest according to principles described herein.

An example of correlation facility 202 correlating multiple detections of an object of interest will now be described with reference to FIG. 3. In FIG. 3, a map view 300 of a geospatial location illustrates geospatial relationships between computer vision model detections of objects of interest in geospatial images. Also, in FIG. 3, geospatial images 302 (e.g., images 302-1, 302-3, and 302-3) represent a set of street-level images of a geospatial location captured from different respective camera positions 304 (e.g., camera positions 304-1, 304-2, and 304-3), which camera positions 304 are indicated on map view 300. In the illustrated example, geospatial image 302-1 is captured from camera position 304-1, geospatial image 302-2 is captured from camera position 304-2, and geospatial image 302-3 is captured from camera position 304-3. In FIG. 3, camera positions 304 are indicated relative to map view 300 and therefore may represent map positions.

Detection boxes 306 (e.g., detection boxes 306-1, 306-2-1, 306-2-2, and 306-3) represent detections of objects of interest made by a computer vision model in images 302. Specifically, detection box 306-1 represents a detection of an object of interest in image 302-1, detection boxes 306-2-1 and 306-2-2 represent detections of objects of interest in image 302-2, and detection box 306-3 represents a detection of an object of interest in image 302-3. Detection boxes 306 may be bounding boxes or any other markers generated by the computer vision model to indicate positions of detected objects of interest in images 302.

Icons 308 (e.g., icons 308-1, 308-2-1, 308-2-2, and 308-3) represent, within map view 300, the detections represented by detection boxes 306 shown in images 302. Specifically, triangle icon 308-1 represents the detection represented by detection box 306-1, square icons 308-2-1 and 308-2-2 represent the detections represented by detection boxes 306-2-1 and 306-202, respectively, and circle icon 308-3 represents the detection represented by detection box 306-3. In FIG. 3, icons 308 are positioned relative to map view 300 and therefore may represent mapped geospatial positions of detections 306.

As mentioned, correlation facility 202 may perform one or more triangulation operations to determine an intersection of detections of an object of interest. For example, correlation facility 202 may identify, from geospatial data associated with images 302 (e.g., geospatial data included in metadata for images 302), geospatial positions of camera positions 304 (e.g., latitude and longitude coordinates of camera positions 304). Correlation facility 202 may also access and use the horizontal range of pixels within each detection box 306 to determine a horizontal center for each detection box 306. Correlation facility 202 may translate the horizontal center for each detection box 306 from pixel or image coordinates to geospatial coordinates and then draw, for each detection box 306, a line that intersects the horizontal center of the detection box 306 and the camera position 304 from which the image associated with the detection box 306 is captured. Such lines may be referred to as "orientation lines." FIG. 3 illustrates orientation lines 310 drawn to connect the horizontal center of each detection box 306 (translated to geospatial coordinates on map view 300) with the respective camera position 304 from which the image in which the detection is made was captured. Specifically, orientation line 310-1 connects camera position 304-1 with icon 308-1 that represents a detection indicated by detection box 306-1, orientation line 310-2-1 connects camera position 304-2 with icon 308-2-1 that represents a detection indicated detection box 306-2-1, orientation line 310-2-2 connects camera position 304-2 with icon 308-2-2 that represents a detection indicated by detection box 306-2-2, and orientation line 310-3 connects camera position 304-3 with icon 308-3 that represents a detection indicated by detection box 306-3.

Correlation facility 202 may use orientation lines 310 to determine intersections of detections of objects of interest. For example, correlation facility 202 may determine geospatial positions at which orientation lines 310 intersect and select a determined intersection of orientation lines 310 to represent an intersection of detections of an object of interest that are associated with orientation lines 310. To illustrate, correlation facility 202 may, through triangulation operations and/or in any other suitable way, determine that orientation lines 310-2-2 and 310-3 intersect and identify the intersection of orientation lines 310-2-2 and 310-3 as an intersection of detections associated with orientation lines 310-2-2 and 310-3, which in the illustrated example includes detections represented by detection boxes 306-2-2 and 306-3 in images 302-2 and 302-3, respectively. FIG. 3 illustrates, within map view 300, a determined intersection 312 of orientation lines 310-2-2 and 310-3.

Correlation facility 202 may define detections that share a common intersection to be a set of correlated detections for an object of interest. For example, based on the determination that detections represented by detection boxes 306-2-2 and 306-3 (and by icons 308-2-2 and 308-3) intersect at intersection 312, as described above, correlation facility 202 may group the detections into a set of correlated detections because the detections appear to be of an object of interest located at a common geospatial position. In the above-described manner, or in any other suitable manner, correlation facility 202 may determine, from geospatial data associated with geospatial images and/or detections made by a computer vision model in the geospatial images, a set of correlated detections of an object of interest.

For illustrative purposes, FIG. 3 shows a simplified example of correlation of detections of an object of interest. In other examples, correlation facility 202 may perform correlation operations on large numbers of detections of objects of interest that have been generated by one or more computer vision models from geospatial imagery. Such operations on large numbers of detections may be computationally intensive. To help reduce the demands of such operations, in certain examples, correlation facility 202 may be configured to perform one or more filtering operations to filter detections generated by a computer vision model before correlating the detections. This may allow correlation facility 202 to perform correlation operations on a subset of the detections output by the computer vision model. Such filtering operations may include filtering detections based on confidence levels of the detections and/or estimated widths or distances of detections from corresponding cameras. Examples of such pre-correlation filtering operations are described herein.

Returning to FIG. 2, attribute determination facility 204 may be configured to use correlated detections of an object of interest to determine one or more attributes of the detected object of interest. The determination of the one or more attributes may include attribute determination facility 204 performing one or more consistency checks on the correlated detections of the object of interest to identify consistencies and/or inconsistencies across the correlated detections and using the identified consistencies and/or inconsistencies to determine one or more attributes of the object of interest. For example, attribute determination facility 204 may use metadata for the detections to check for consistencies across the correlated detections to verify (e.g., corroborate) potentially true detections and/or to check for inconsistencies across the correlated detections to identify and act on (e.g., filter out) potentially false detections. Examples of consistency checks that may be performed by attribute determination facility 204 will now be described.

In certain examples, attribute determination facility 204 may perform a size consistency check to identify consistencies and/or inconsistencies in sizes of an object of interested as represented by correlated detections of the object of interest. Attribute determination facility 204 may use identified consistencies to verify true detections and/or identified inconsistencies to identify false detections, which may then be used by attribute determination facility 204 to determine a size attribute for the detected object of interest.

Figure 4:
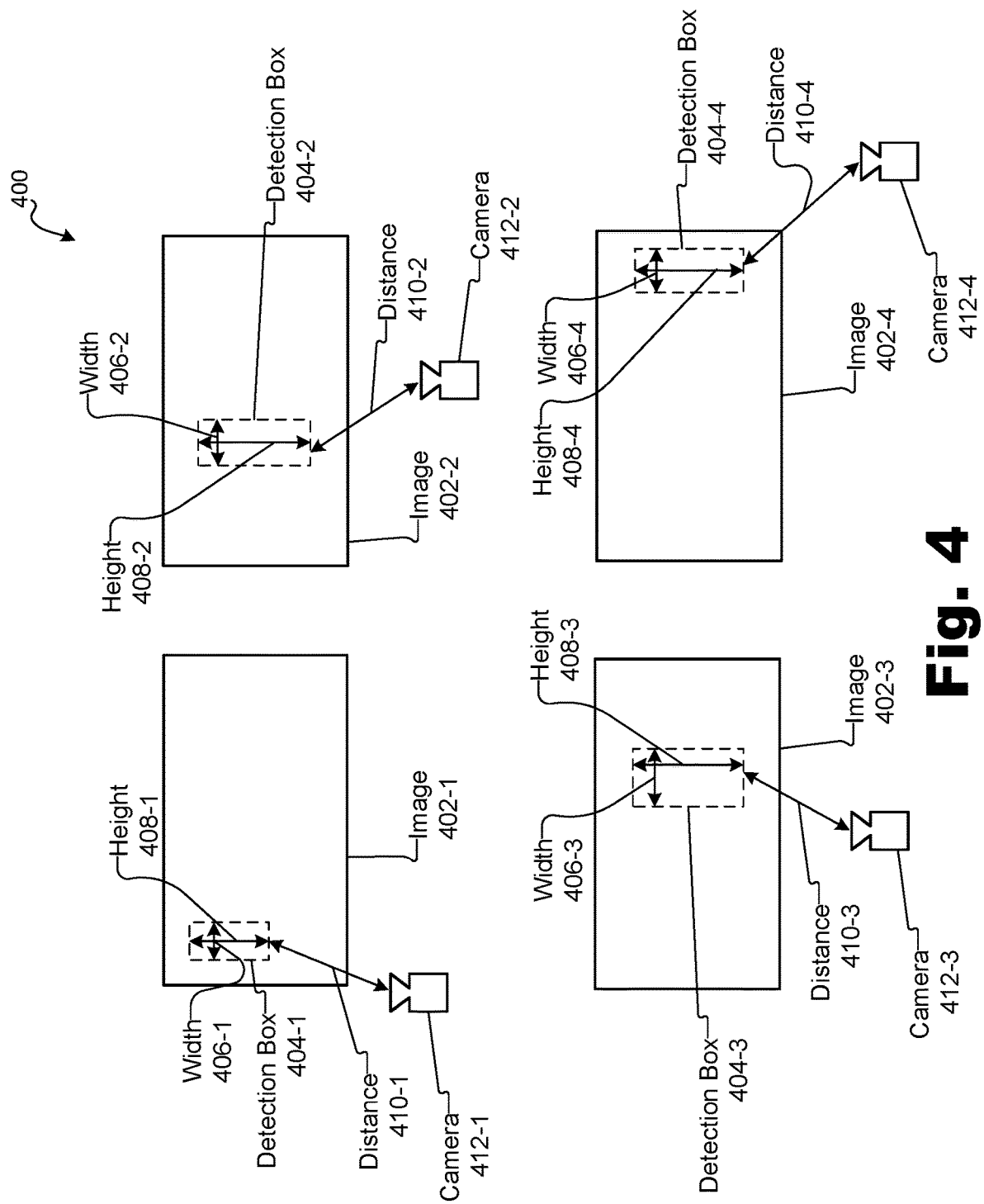
FIG. 4 illustrates an example of comparing sizes of an object of interest across correlated detections of the object of interest according to principles described herein.

An example of attribute determination facility 204 comparing sizes of an object of interest between correlated detections will now be described with reference to FIG. 4. In FIG. 4, a set 400 of images depicting an object of interest includes multiple images 402 (e.g., images 402-1, 402-2, 402-3, and 402-4) including detection boxes 404 (e.g., detection boxes 404-1, 404-2, 404-3, and 404-4) that represent detections of objects of interest. Specifically, detection box 404-1 represents a detection of an object of interest in image 402-1, detection box 404-2 represents a detection of an object of interest in image 402-2, detection box 404-3 represents a detection of an object of interest in image 402-3, and detection box 404-4 represents a detection of an object of interest in image 402-4. Each of the detection boxes 404 includes a width 406 (e.g., width 406-1 of detection box 404-1, width 406-2 of detection box 404-2, and so on) and a height 408 (e.g., height 408-1 of detection box 404-1, height 408-2 of detection box 404-2, and so on). Each of the detection boxes 404 is also associated with a distance 410 that the respective detection box 404 is from a camera position 412 (e.g., a distance 410-1 from detection box 404-1 to camera 412-1, a distance 410-2 from detection box 404-2 to camera 412-2, and so on).

Widths 406 (e.g., widths 406-1, 406-2, 406-3, and 406-4) may represent one dimension of a size of the detection boxes 404 determined by a computer vision model (e.g., computer vision model 112 as previously described). Specifically, width 406-1 represents a width of detection box 404-1, width 406-2 represents a width of detection box 404-2, width 406-3 represents a width of detection box 404-3, and width 406-4 represents a width of detection box 404-4. Similarly, heights 408 (e.g., heights 408-1, 408-2, 408-3, and 408-4) may represent another dimension of a size of the detection boxes determined by the computer vision model. Specifically, height 408-1 represents a height of detection box 404-1, height 408-2 represents a height of detection box 404-2, height 408-3 represents a height of detection box 404-3, and height 408-4 represents a height of detection box 404-4.

Distances 410 (e.g., distances 410-1, 410-2, 410-3, and 410-4) may each represent a distance of a detection box 404 from a camera 412 that captured the respective image that includes the detection box 404. Specifically, distance 410-1 represents a distance of detection box 404-1 from a camera 412-1, distance 410-2 represents a distance of detection box 404-2 from a camera 412-2, distance 410-3 represents a distance of detection box 404-3 from a camera 412-3, and distance 410-4 represents a distance of detection box 404-4 from a camera 412-4.

A distance from a camera 412 to a detection box 404 may be determined and/or represented in any suitable way, including any way in which an image position of the detection box 404 within an image 402 is translated to a geospatial position that may be used to determine a distance from the geospatial position associated with the detection box 404 to a geospatial position of the camera 412. In certain examples, the distance may be included in or be derivable from metadata for the image 402. Attribute determination facility 204 may utilize metadata for a correlated set of detections (e.g., detections represented by detection boxes 404) and/or images 402, including any distance and/or other information specified by the metadata, to determine consistencies or inconsistencies between sizes of the object of interest in each of the detections.

In order to compare sizes of detected objects of interest represented by detection boxes 404, attribute determination facility 204 may calculate a size of the object of interest represented by each detection box 404 based on any suitable combination of width 406, height 408, and distance 410 of the detection box 404. For example, attribute determination facility 204 may calculate the size of a detected object of interest based on width 406 and distance 410 of a detection box 404, based on height 408 and distance 410 of a detection box 404, or based on width 406, height 408, and distance 410 of a detection box 404. The calculation of the size of the object of interest may be performed in any suitable way, based on such combinations of distance 410, width 406 and/or height 408 of a detection box 404. For example, attribute determination facility 204 may calculate the size of a detected object of interest by utilizing triangulation techniques to calculate an estimated size of an object of interest based on a distance 410 and on a width 406 and/or a height 408 of a detection box 404 that represents the detected object of interest. In another example, attribute determination facility 204 may translate pixels associated with a detection box 404 of an image 402 to a corresponding size (e.g., an estimated width and height) of the object of interest. Any other way of calculating an estimated size of a detected object of interest based on a width 406, a height 408, a distance 410, and/or any other information associated with an image 402 (e.g., information associate with a capture of the image 402) or the detection of the object of interest in the image 402 may be used as may suit a particular implementation.

Attribute determination facility 204 may compare the calculated sizes of the detected objects of interest represented by detection boxes 404 to check for consistencies or inconsistencies between detections in the correlated set of detections. Examples of attribute determination facility 204 using the identified object size consistencies and/or inconsistencies to determine attributes of an object of interest are described herein.

Returning to FIG. 2, attribute determination facility 204 may perform additional or alternative consistency checks on correlated detections. In an example, attribute determination facility 204 may determine whether a determined intersection for correlated detections of an object of interest is consistent with data from one or more external sources. Attribute determination facility 204 may compare the correlated detections to data from the external sources in any suitable manner. For example, attribute determination facility 204 may compare the determined intersection with information from one or more external sources to check for consistency or inconsistency between the various detections and the external sources.

Figure 5:
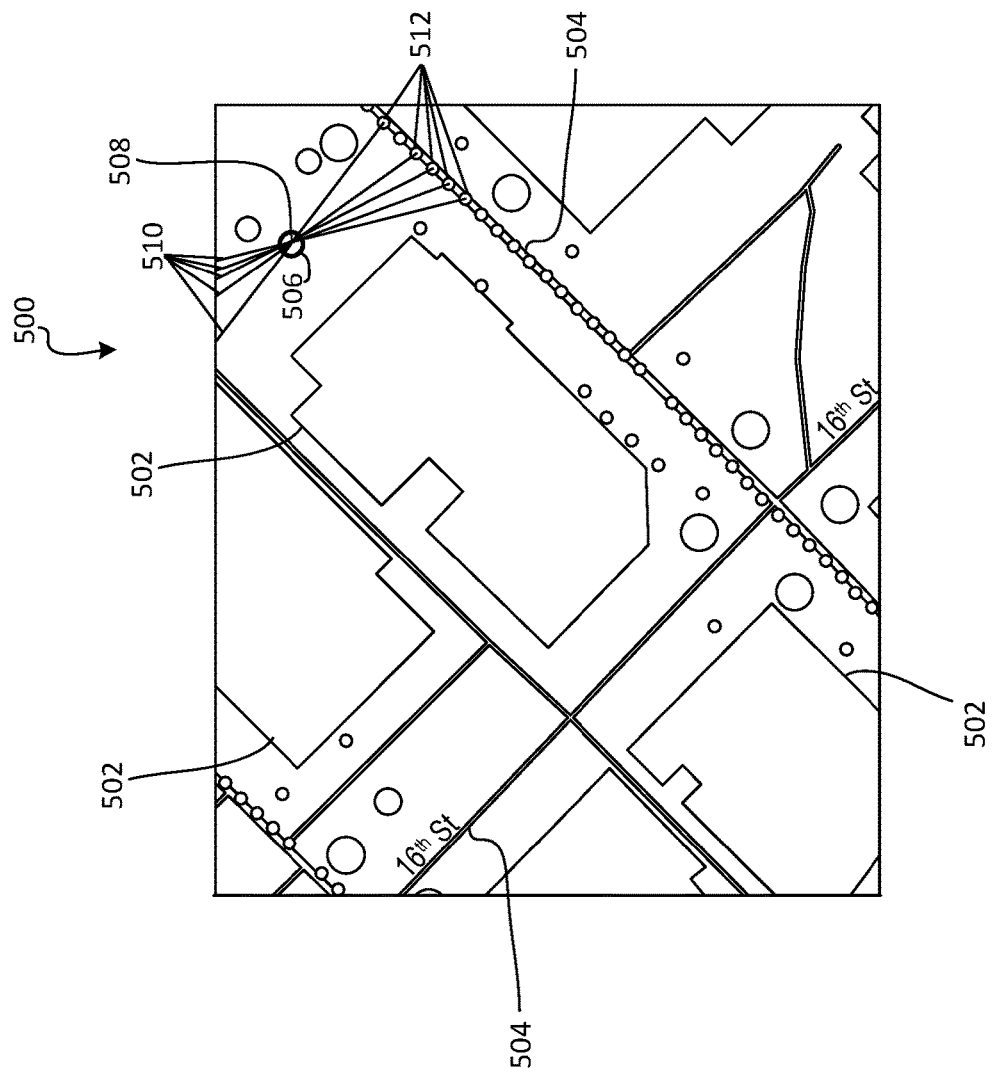
FIG. 5 illustrates an exemplary user interface map view showing a geospatial intersection of a detected object of interest according to principles described herein.

An example of attribute determination facility 204 comparing metadata of correlated detections with data from external sources will now be described with reference to FIG. 5. In FIG. 5, a map view 500 of a geospatial location illustrates a visual representation of data from one or more external data sources, which may include one or more map databases. As shown, the map view 500 includes visual representations of building footprints 502 and roadways 504 that may be received from the external data sources. Map view 500 further includes a visual representation of detected object of interest 506 positioned at a determined intersection 508 of multiple correlated detections. Multiple orientation lines 510 extending from camera locations 512 and intersecting at intersection 508 are shown in map view 500 and may represent the use of orientation lines to determine intersection 508.

Attribute determination facility 204 may compare a geospatial position of the determined intersection 508 to geospatial positions of building footprints 502 and/or roadways 504 represented in data from external sources to check whether correlated detections are consistent with the data from the external sources. In an example, attribute determination facility 204 may perform this consistency check by determining whether the determined intersection 508 of the object of interest 506 is at an expected or unexpected geospatial position relative to the geospatial positions of building footprints 502 and/or roadways 504. For example, in examples in which the object of interest 506 is an object (e.g., a traffic light, a light pole, a sign, or the like) that should be located at a position outside of building footprint 502 and/or roadway 504, attribute determination facility 204 may determine whether the geospatial position of the intersection 508 of the correlated detections is outside of building footprints 502 and/or roadways 504 as expected. If the geospatial position of the intersection 508 of the correlated detections is located outside of building footprints 502 and/or roadways 504 as expected, attribute determination facility 204 may determine that the intersection 508 is consistent with external data. If the geospatial position of the intersection 508 of the correlated detections is located within any of building footprints 502 and/or roadways 504, attribute determination facility 204 may determine that the intersection 508 is inconsistent with external data. Attribute determination facility 204 may determine that detections consistent with the data from the external sources are true detections and detections inconsistent with the data from the external sources are false detections.

Returning to FIG. 2, attribute determination facility 204 may perform additional or alternative consistency checks on correlated detections. For example, attribute determination facility 204 may compare determined classes of detected objects of interest across correlated detections to identify consistencies and/or inconsistencies. Attribute determination facility 204 may determine that detections having the same assigned class are consistent in class and may be true detections. Additionally or alternatively, attribute determination facility 204 may determine that a detection having a different assigned class from other detections is inconsistent and may be a false detection.

Attribute determination facility 204 may determine a reasonability of correlated detections as an additional or alternative consistency check. In an example, the reasonability of the correlated detections may be based on detected attributes of the object of interest in the correlated detections. Attribute determination facility 204 may compare any detected attribute, or a combination of detected attributes, of an object of interest in a detection to a predefined reasonability test. Attribute determination facility 204 may determine consistencies or inconsistencies of a detection based on whether the attribute or attributes of the object of interest in the detection satisfy the reasonability test.

To illustrate, attribute determination facility 204 may compare two attributes (e.g., a class and a height) of an object of interest in a detection to determine whether the attributes satisfy a reasonability test. For example, a reasonability test may determine whether a height of an object of interest having a particular class (e.g., a pole) is within a range of expected heights (e.g., two meters to ten meters) for the class. If the height of the object of interest falls within the range of heights, attribute determination facility 204 may determine that the attributes satisfy the reasonability test, thus resulting in a consistent or true detection. Conversely, if the height of the object of interest does not fall within the range of heights, attribute determination facility 204 may determine that the attributes of the object of interest do not satisfy the reasonability test, thus resulting in an inconsistent or false detection.

In certain examples, attribute determination facility 204 may base a consistency and/or an inconsistency determination for correlated detections on a number of consistent detections of the object of interest. In an example, attribute determination facility 204 may determine consistency or inconsistency for correlated detections based on whether the number of consistent detections included in the correlated detections includes a critical mass of consistent detections, which may be a defined threshold number of consistent detections. The threshold number of consistent detections may be defined as may suit a particular implementation and/or geospatial location. For example, the threshold number of consistent detections for a rural geospatial location may be one amount (e.g., 3), and the threshold number of consistent detections for an urban setting may be another amount (e.g., 10). Thus, in certain examples, attribute determination facility 204 may identify detections as consistent if the number of detections satisfies the threshold number, and as inconsistent if the number of detections does not satisfy the threshold number.

In certain examples, attribute determination facility 204 may determine whether to consider a set of correlated detections for further processing, such as consistency checks and attribute determinations, based on whether a number of detections in the set satisfies a defined critical mass, which may be a defined threshold number of detections. The threshold number of correlated detections may be defined as may suit a particular implementation and/or geospatial location. For example, the threshold number of correlated detections for a rural geospatial location may be one amount (e.g., 5), and the threshold number of correlated detections for an urban setting may be another amount (e.g., 15). Attribute determination facility 204 may identify correlated detections as inconsistent if the number of correlated detections does not satisfy the threshold number of correlated detections. If the number of correlated detections satisfies the threshold number of correlated detections, attribute determination facility 204 may subject the correlated detections to one or more consistency checks, such as any of those described herein.

Attribute determination facility 204 may utilize consistent and/or inconsistent detections determined in one or more of the consistency checks described above to determine one or more attributes for an object of interest represented by correlated detections. In an example, attribute determination facility 204 may determine the attributes for the object of interest based on attributes of consistent detections, and not based on attributes of inconsistent detections. For example, attribute determination facility 204 may filter out inconsistent detections before one or more attributes for the object of interest are determined.

In certain examples, attribute determination facility 204 may be configured to filter out detections as inconsistent detections only when the detections have been identified as inconsistent in a specific, defined way (e.g., inconsistent in size or class, for example) or as inconsistent at least a defined threshold number of times or in at least a defined threshold number of ways (e.g., in at least two different ways, such as in both size and class). In an example, attributes of a detection may be utilized in determining attributes for the object of interest if the detection was determined to be inconsistent by one consistency check but determined to be consistent by multiple other consistency checks.

In certain examples, attribute determination facility 204 may generate scores (e.g., confidence or consistency scores) for detections based on the determined consistencies or inconsistencies and use the scores to determine attributes for an object of interest. For example, attribute determination facility 204 may rank detections according consistency scores and may select, from the ranked detections, detections to be utilized in determining attributes of an object of interest and/or weights to be given to detections in determining attributes of the object of interest based on the ranking of the detections. For example, in determining attributes of the object of interest, attribute determination facility 204 may select and use detections with scores that satisfy a defined threshold level.

Attribute determination facility 204 may determine one or more attributes for an object of interest based on selected detections (e.g., detections selected based on outputs from one or more of the consistency checks) of the object of interest in any suitable way. For example, attribute determination facility 204 may determine one or more attributes for an object of interest based on one or more attributes of the selected detections that have been determined by a computer vision model. For instance, attribute determination facility 204 may utilize the determined intersection for the selected detections to determine a geospatial position for the object of interest. The geospatial position may be a global positioning system (GPS) coordinate position, a latitude and longitude position, or the like.

Attribute determination facility 204 may similarly utilize other determined attributes of the selected detections to determine other attributes for the object of interest. For example, attribute determination facility 204 may utilize the determined class of the selected detections to determine a class and/or one or more other attributes of the object of interest. In an example, attribute determination facility 204 may utilize metadata for the selected detections to identify and use attributes of the selected detections to determine one or more attributes (e.g., height, width, distance from a camera, line of sight from a roadway, number of detections, or the like) for the object of interest in the detections.

Assignment facility 206 shown in FIG. 2 may be configured to use the determined attributes of the object of interest (determined by attribute determination facility 204) to select one or more attributes for inclusion in a dataset for the object of interest. Inclusion of the attributes in the dataset for the object of interest may effectively assign the attributes to the object of interest such that the attributes are available for access and use by a computing process accessing the dataset for the object of interest. The computing process may include or be associated with any suitable application or service, such as a geographic mapping application or service. In an example, assignment facility 206 may select determined attributes in a dataset that may be utilized by geospatial image processing system 100 and/or by a user of the geospatial image processing system 100 of FIG. 1. Examples of attributes that may be selected for inclusion in a dataset for an object of interest may include, but are not limited to, a geospatial location of the object of interest, a height of the object of interest, the number of correlated detections or consistent detections of the object of interest, a material of composition of the object of interest, a class of the object of interest, and/or information about any other characteristic of the object of interest.

Figure 6:
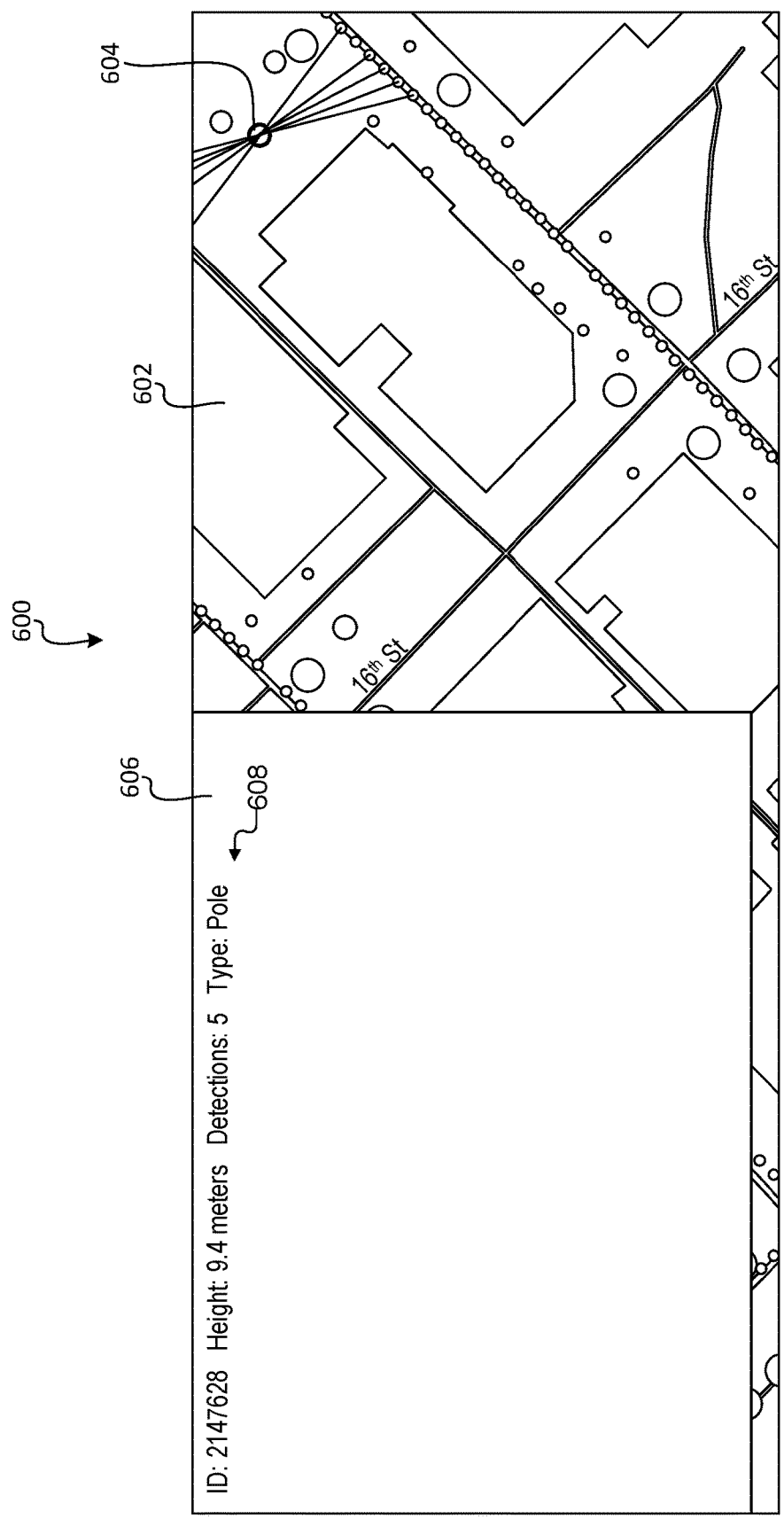
FIG. 6 illustrates an exemplary user interface map view showing attributes for a detected object of interest according to principles described herein.

FIG. 6 shows an exemplary graphical user interface view 600 indicating attributes that have been assigned to a detected object of interest by system 100. As shown, the graphical user interface view 600 may include a map view 602 visually indicating a geospatial position 604 of an object of interest. The graphical user interface view 600 may further include an overlay 606 indicating other attributes 608 assigned to the object of interest, including the height of the object, the number of detections for the object, and a class of object (e.g., 9.4 meters, 5 detections, and pole). In an example, a user may provide user input to select different objects of interest within the map view 602 to have the attributes for that object of interest displayed in overlay 606.

Thus, returning to FIG. 2, facilities 202 through 206 may perform one or more operations on data representing detections of an object of interest to correlate the detections, to determine one or more attributes for the object of interest based on consistency checks for the correlated detections, and to select the determined attributes for inclusion in a dataset for the object of interest.

Figure 7:
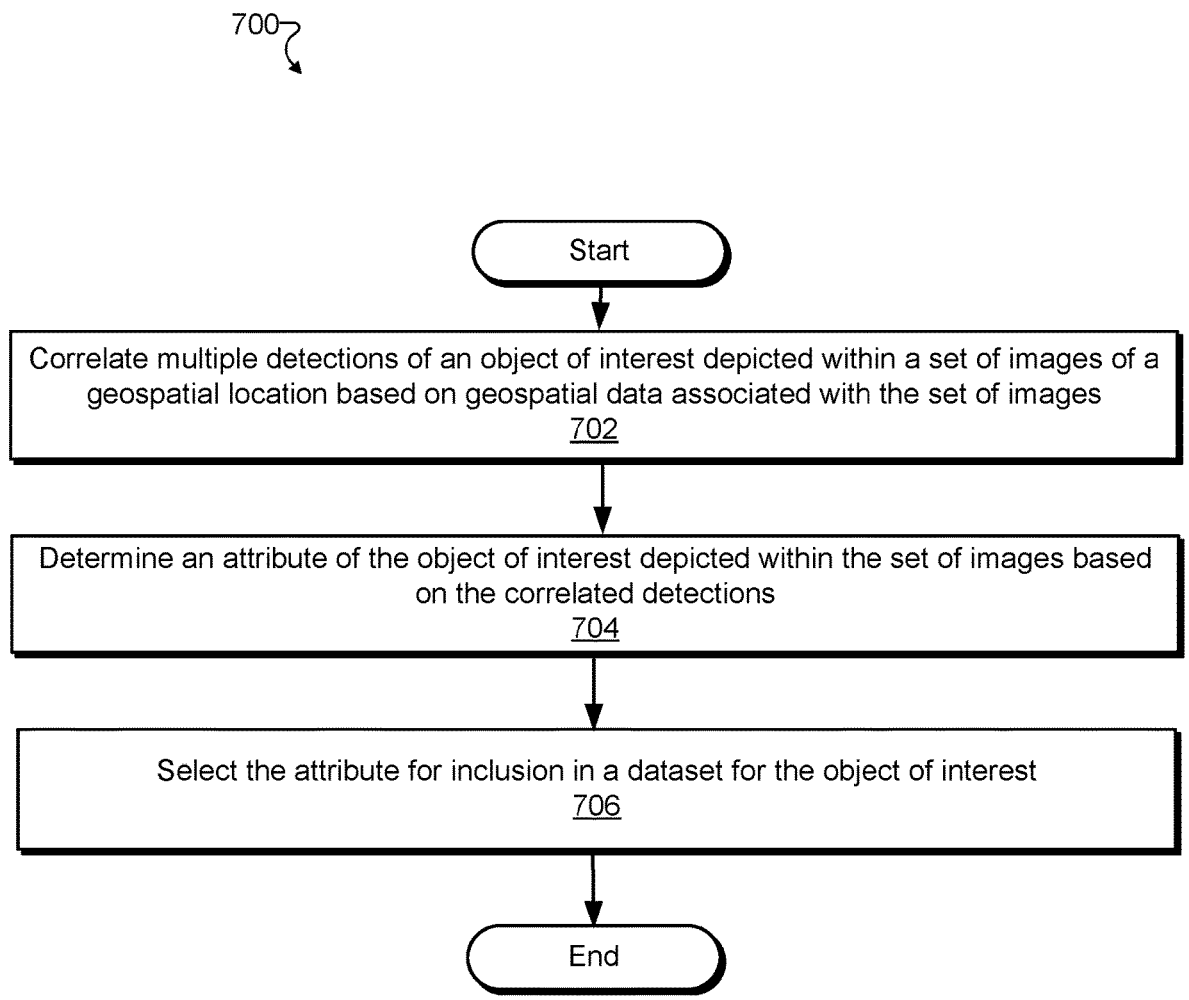
FIG. 7 illustrates an exemplary method for detecting and assigning attributes to objects of interest in geospatial imagery according to principles described herein.

FIG. 7 illustrates an exemplary method 700 for detecting and assigning attributes to objects of interest in geospatial imagery. While FIG. 7 illustrates exemplary operations according to one embodiment, other embodiments may omit, add to, reorder, and/or modify any of the operations shown in FIG. 7. One or more of the operations shown in FIG. 7 may be performed by system 100 and/or post-processing system 200, any components included therein, and/or any implementation thereof.

In operation 702, multiple detections of an object of interest depicted within a set of images of a geospatial location are correlated based on geospatial data associated with the set of images. Operation 702 may be performed in any of the ways described herein. In an example, a geospatial image processing system may correlate the detections by performing any suitable number and/or combination of post-processing operations on geospatial data associated with the detections within the set of images. The correlation post-processing operations may include identifying detections of potentially the same instance of an object of interest in the geospatial images of the geospatial location. For example, geospatial data associated with the geospatial images of the geospatial location may be used to identify multiple detections that intersect at a geospatial intersection. In certain examples, multiple detections that intersect at a geospatial intersection may be identified by performing one or more triangulation operations to determine that the geospatial intersection corresponds to each of the multiple detections. The identified multiple detections may be selected for inclusion in a correlated set of detections based on the multiple detections intersecting at the same geospatial intersection.

In an example, the correlating of the multiple detections may include pre-correlation filtering out certain detections based on predefined criteria, which may reduce the number of detections to be correlated. For example, detections with a confidence level that is below a threshold level may be filtered out prior to the correlation of detections. Detections with confidence levels below the threshold level may be filtered out because these detections may be determined to be too low of quality to be used to accurately determine attributes for the object of interest.

Additionally or alternatively, detections that do not have a detected width above a predefined threshold level may be filtered out prior to the correlation of detections. Detections with widths below the threshold level may be filtered out because such widths may indicate that the detections may be positioned too far from a camera that captured the images to accurately determine attributes for the object of interest.

In operation 704, an attribute of the object of interest depicted within the set of images of the geospatial location is determined based on the correlated detections. Operation 704 may be performed in any of the ways described herein. In an example, a geospatial image processing system may determine the attribute for the object of interest based on consistent detections that are verified as true detections (e.g., through corroboration of consistent detections) and selected for use in determining the attribute for the object of interest.

In operation 706, the attribute is selected for inclusion in a dataset for the object of interest. Operation 706 may be performed in any of the ways described herein.

Figure 8:
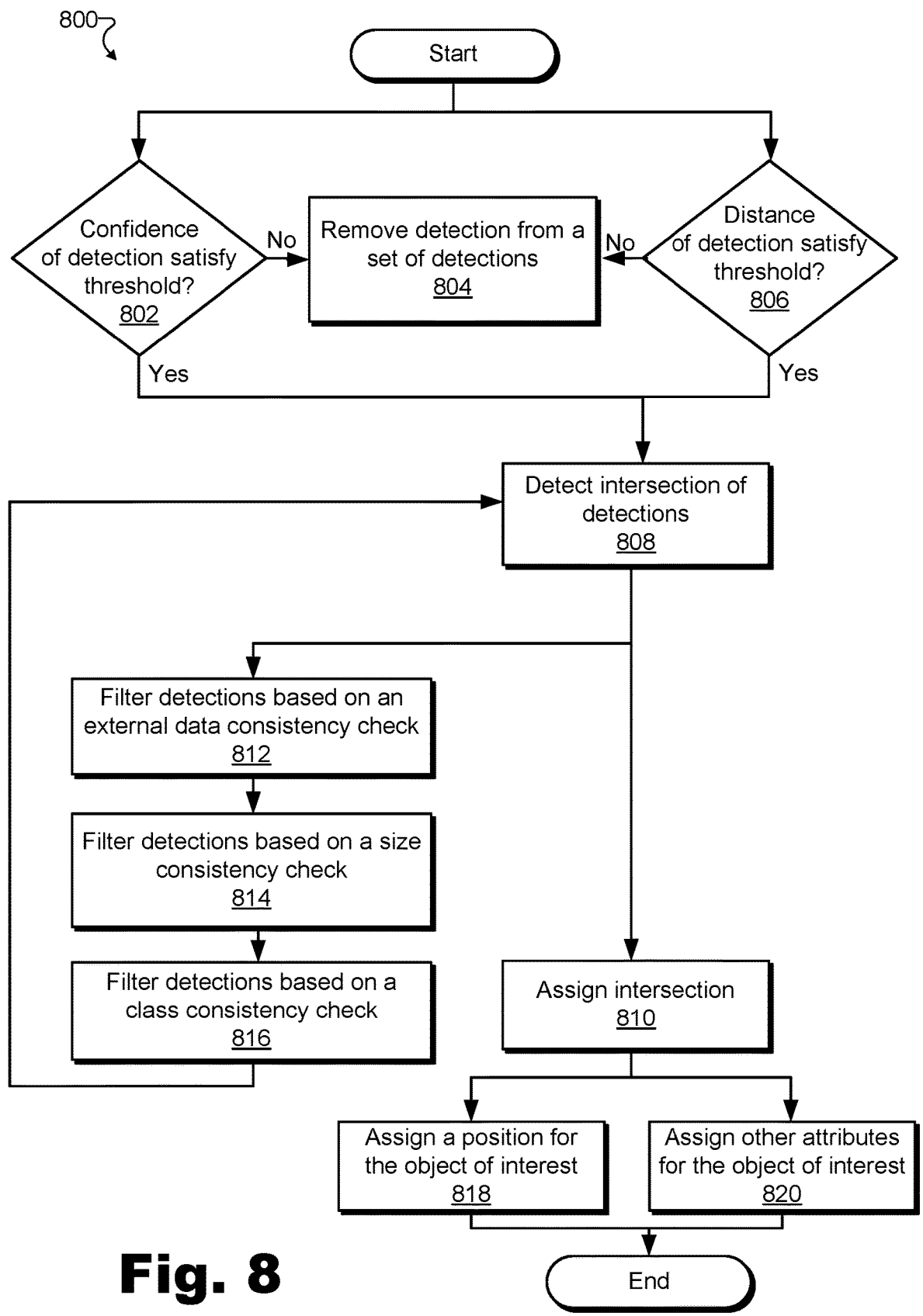
FIG. 8 illustrates another exemplary method for detecting and assigning attributes to objects of interest in geospatial imagery according to principles described herein.

FIG. 8 illustrates an exemplary method 800 for detecting and assigning attributes to objects of interest in geospatial imagery. While FIG. 8 illustrates exemplary operations according to one embodiment, other embodiments may omit, add to, reorder, and/or modify any of the operations shown in FIG. 8. One or more of the operations shown in FIG. 8 may be performed by system 100 and/or post-processing system 200, any components included therein, and/or any implementation thereof.

In operation 802, a determination is made whether a confidence level of a detection included in a set of detections satisfies a threshold confidence level. If the confidence level for a detection does not satisfy the threshold level, the detection is removed from the set of detections at operation 804. Otherwise, if the confidence level satisfies the threshold confidence level, the flow continues at operation 808.

In operation 806, a determination is made whether a distance that the object of interest represented by the detection is from a camera satisfies a threshold distance. If the distance does not satisfy the threshold distance (e.g., the distance is too far), the detection is removed from the set of detections at operation 804. Otherwise, if the distance satisfies the threshold distance, the flow continues at operation 808.

In operation 808, detections that are included in the set of detections and not filtered out by operation 802 or 806 are used to detect an intersection for the detections. Operation 808 may be performed in any of the ways described herein, such as by selecting, from the set of detections, a correlated set of detections based on the detections in the correlated set having a common intersection. The detections may be depicted within the set of images.

In operation 810, the detected intersection is assigned to the detections in the correlated set of detections. Operation 810 may be performed in any of the ways described herein. In certain examples, operations 802 through 810 may be performed by correlation facility 202 in any manner described herein.

In certain examples, a set of detections may be filtered by one or more checks. For example, in operation 812, the set of detections may be filtered based on an external data consistency check. In an example, external data may be received from a data source other than metadata for the set of images in which the detections are made. The external data may be used to check detections for consistency with the external data. In an example, any detections that are not consistent with the external data are filtered out of the set of detections in operation 812.

In operation 814, the set of detections may be filtered based on a size consistency check. In an example, sizes of the detections may be compared to determine consistencies and/or inconsistencies between the detections. The size consistency check may be performed in any manner described herein. Detections that do not have consistent sizes with the other detections in the set of detections may be filtered out in operation 814.

In operation 816, the set of detections may be filtered based on a class consistency check. In an example, assigned classes or types of the object of interest in the detections may be compared, and detections with a class that is inconsistent with the class of the other detections may be filtered out of the set of detections. The class consistency check may be performed in any manner described herein. Detections that do not have consistent classes with the other detections in the set of detections may be filtered out in operation 816.

Information about the detections filtered out or not filtered out in operations 812, 814, and 816 may be provided to operation 808 to update the set of detections. In this manner, inconsistent detections may be filtered out to leave consistent detections to be used to determine attributes of the object of interest, including by detecting and assigning an intersection for the consistent detections in operations 808 and 810. Operations 818 and 820 may then be performed after operation 810 has been performed.

In operation 818, a geospatial position for the object of interest is assigned. The geospatial position may be determined and assigned based on the assigned intersection for the set of detections. In operation 820, another attribute for the object of interest is determined and assigned based on determined attributes for the set of detections, which attributes may be indicated by metadata for the set of detections. In certain examples, operations 812, 814, 816, 818, and 820 may be performed by attribute determination facility 204 and assignment facility 206 in any manner described herein.

As described herein, disclosed methods and systems may detect and assign attributes to objects of interest using multiple images captured from different camera viewpoints of a geospatial location. The camera viewpoints may differ spatially in that the images of the geospatial location may be captured from different geospatial positions and/or orientations relative to a geospatial location and/or a detected object of interest. In addition or alternate to differing spatially, in some examples, the camera viewpoints may differ temporally in that the images of the geospatial location may be captured at different times. The times may differ by any suitable amount of time, such as by seconds, minutes, hours, days, weeks, months, etc.

In certain examples, methods and systems described herein may utilize information about times that images of a geospatial location are captured to determine and assign attributes to objects of interest detected in the images. For example, post-processing system 200 may access and use metadata associated with a set of images to identify and use capture times associated with the images to determine and assign an attribute to an object of interest depicted in one or more of the images.

As an example, post-processing system 200 may determine that a detected object of interest is a transient object, such as by determining that the object of interest is detected in an image of a geospatial location captured at one time but is not detected in an image of the geospatial location captured at a different time. In this example, post-processing system 200 may filter detections of the object of interest out of a set of detections associated with the geospatial location, flag the object of interest as a transient or potentially transient object of interest, or perform one or more other actions in response to the determination that the object of interest is a transient object of interest.

As another example, post-processing system 200 may utilize capture times for images of a geospatial location to determine and assign attributes to objects of interest based on times of day that the images are captured. For instance, post-processing system 200 may utilize night-time imagery to determine and/or verify attributes of objects of interest, particularly in cases in which the objects of interest include lights or are typically illuminated by lights at night (e.g., traffic lights, street lights, roadways, etc.) and/or in cases in which the objects of interest do not include or are not typically illuminated by lights at night (e.g., farm land, trails, rivers, etc.).

As another example, post-processing system 200 may utilize images of a geospatial location captured at different times to determine attributes of objects of interest in cases in which the objects of interest change over time. For instance, post-processing system 200 may utilize images of a geospatial location captured at different times to detect differences in a detected object of interest and to determine an attribute of the object of interest based on the detected differences of the object of interest over time. To illustrate, post-processing system 200 may classify a detected object of interest as a tree or a deciduous tree based on changes to the canopy of the tree over seasons of the year.

Attributes of an object of interest that are determined and assigned as described herein may be used in various ways and in various applications and/or use cases. For example, determined attributes of an object of interest may be included in a dataset for the object of interest, and the dataset may be used in various applications and/or use cases.

As an example, the dataset may be used by a mapping and/or navigation application to provide one or more features associated with the object of interest, such as a search feature that includes the dataset in data searched by a search engine and/or in the results produced by a search of the data, a user interface feature that indicates attributes of the object of interest in a graphical user interface view (e.g., a map view), a recommendation feature that considers the dataset in determining a recommendation (e.g., a recommended travel route, a recommended point of interest, etc.) to provide to a user, a navigation feature that considers the dataset in determining a recommended or actual travel route, and/or another feature of the mapping and/or navigation application.

As another example, the dataset may be used for planning and buildout of infrastructure in a geospatial location. For example, attributes of an object of interest, as represented in the dataset, may indicate and/or may be used to determine candidate geospatial locations for infrastructure components to be deployed. Examples of such infrastructure components include, but are not limited to, traffic signal components (e.g., traffic lights, signage, etc.), video and/or audio capture components (e.g., traffic cameras), communication network components (e.g., wireless network components such as transceivers, antennae, etc.) for any suitable wireless network (e.g., a wireless wide area network, local area network, 5G network, Wi-Fi network, etc.), and/or parking components (e.g., parking spaces, meters, etc.).

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer may read.

Figure 9:
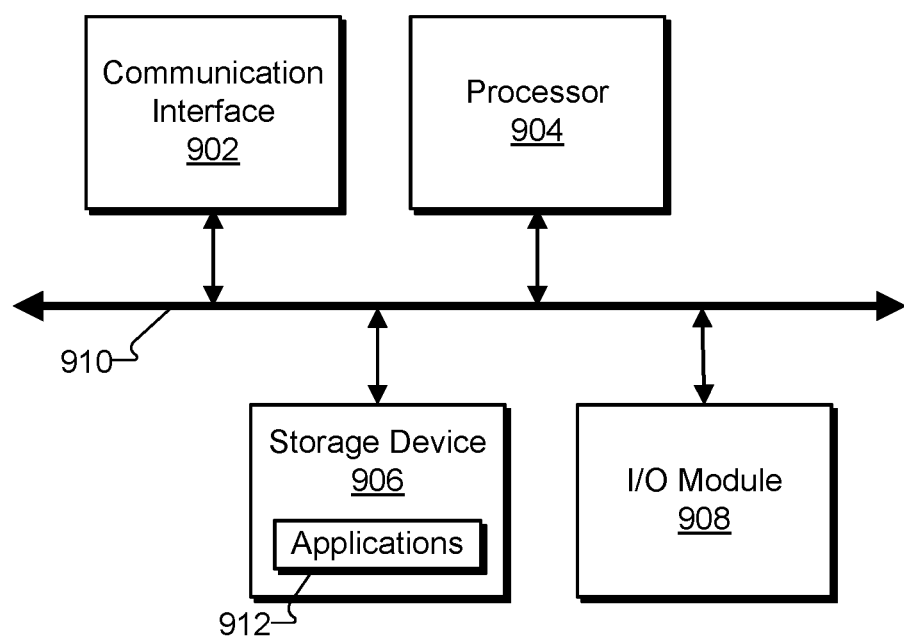
FIG. 9 illustrates an exemplary computing device according to principles described herein.

FIG. 9 illustrates an exemplary computing device 900 that may be specifically configured to perform one or more of the processes described herein. As shown in FIG. 9, computing device 900 may include a communication interface 902, a processor 904, a storage device 906, and an input/output ("I/O") module 908 communicatively connected via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with facilities 102 through 110 of system 100 and/or facilities 210 through 218 of post-processing system 200. Likewise, storage facility 110 of system 100 may be implemented by or within storage device 906.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
correlating, by a post-processing system based on geospatial data associated with a set of images of a geospatial location, multiple detections of an object of interest depicted within the set of images of the geospatial location,
wherein
the set of images includes multiple images captured from different camera viewpoints of the geospatial location, and
the correlating of the multiple detections includes selecting the multiple detections for inclusion in a correlated set of detections from a plurality of possible detections of the object of interest within images captured from the different camera viewpoints of the geospatial location;

determining, by the post-processing system based on the correlated detections, an attribute of the object of interest depicted within the set of images of the geospatial location; and
selecting, by the post-processing system, the attribute for inclusion in a dataset for the object of interest.

2. The method of claim 1, wherein the correlating of the multiple detections further comprises:
determining that the multiple detections intersect at a geospatial intersection; and
selecting the multiple detections for inclusion in the correlated set of detections based on the multiple detections intersecting at the geospatial intersection.

3. The method of claim 2, wherein the determining that the multiple detections intersect at the geospatial intersection comprises performing one or more triangulation operations to determine that the geospatial intersection corresponds to each of the multiple detections.

4. The method of claim 2, wherein the determining the attribute of the object of interest based on the correlated detections comprises:
determining a geospatial position of the object of interest based on the geospatial intersection at which the correlated detections intersect.

5. The method of claim 1, wherein the determining the attribute of the object of interest based on the correlated detections comprises:
determining a consistency or an inconsistency across the correlated detections; and
determining the attribute of the object of interest based on the consistency or the inconsistency across the correlated detections.

6. The method of claim 5, wherein the consistency or the inconsistency across the correlated detections comprises a consistency or an inconsistency in at least one of an object class and an object size across the correlated detections.

7. The method of claim 1, wherein the determining the attribute of the object of interest based on the correlated detections comprises:
determining a consistency or an inconsistency between a detection included in the correlated detections and geospatial data accessed from data source other than the set of images of the geospatial location; and
determining the attribute of the object of interest based on the consistency or the inconsistency between the detection and the geospatial data accessed from the data source other than the set of images of the geospatial location.

8. A system comprising:
at least one physical computing device configured to:
correlate, based on geospatial data associated with a set of images of a geospatial location, multiple detections of an object of interest depicted within the set of images of the geospatial location,
wherein
the set of images includes multiple images captured from different camera viewpoints of the geospatial location, and
the correlation of the multiple detections includes selecting the multiple detections for inclusion in a correlated set of detections from a plurality of possible detections of the object of interest within images captured from the different camera viewpoints of the geospatial location;
determine, based on the correlated detections, an attribute of the object of interest depicted within the set of images of the geospatial location; and select the attribute for inclusion in a dataset for the object of interest.

9. The system of claim 8, wherein the correlation of the multiple detections further comprises:
the at least one physical computing device is further configured to:
determine that the multiple detections intersect at a geospatial intersection; and
select the multiple detections for inclusion in the correlated set of detections based on the multiple detections intersecting at the geospatial intersection.

10. The system of claim 9, wherein the determination that the multiple detections intersect at the geospatial intersection comprises performing one or more triangulation operations to determine that the geospatial intersection corresponds to each of the multiple detections.

11. The system of claim 9, wherein the determination of the attribute of the object of interest based on the correlated detections comprises:
the at least one physical computing device is further configured to:
determine a geospatial position of the object of interest based on the geospatial intersection at which the correlated detections intersect.

12. The system of claim 8, wherein the determination of the attribute of the object of interest based on the correlated detections comprises:
the at least one physical computing device is further configured to:
determine a consistency or an inconsistency across the correlated detections; and
determine the attribute of the object of interest based on the consistency or the inconsistency across the correlated detections.

13. The system of claim 12, wherein the consistency or the inconsistency across the correlated detections comprises a consistency or an inconsistency in at least one of an object class and an object size across the correlated detections.

14. The system of claim 8, the determination of the attribute of the object of interest based on the correlated detections comprises:
the at least one physical computing device is further configured to:
determine a consistency or an inconsistency between a detection included in the correlated detections and geospatial data accessed from data source other than the set of images of the geospatial location; and
determine the attribute of the object of interest based on the consistency or the inconsistency between the detection and the geospatial data accessed from the data source other than the set of images of the geospatial location.

15. A non-transitory computer-readable medium storing instructions that, when executed, direct at least one processor of a computing device to:
correlate, based on geospatial data associated with a set of images of a geospatial location, multiple detections of an object of interest depicted within the set of images of the geospatial location,
wherein
the set of images includes multiple images captured from different camera viewpoints of the geospatial location, and
the correlation of the multiple detections includes selecting the multiple detections for inclusion in a correlated set of detections from a plurality of possible detections of the object of interest within images captured from the different camera viewpoints of the geospatial location;
determine, based on the correlated detections, an attribute of the object of interest depicted within the set of images of the geospatial location; and
select the attribute for inclusion in a dataset for the object of interest.

16. The computer-readable medium of claim 15, wherein the correlation of the multiple detections further comprises:
instructions, when executed, direct the at least one processor of the computing device to:
determine that the multiple detections intersect at a geospatial intersection; and
select the multiple detections for inclusion in the correlated set of detections based on the multiple detections intersecting at the geospatial intersection.

17. The computer-readable medium of claim 16, wherein the determination that the multiple detections intersect at the geospatial intersection comprises performing one or more triangulation operations to determine that the geospatial intersection corresponds to each of the multiple detections.

18. The computer-readable medium of claim 16, wherein the determination of the attribute of the object of interest based on the correlated detections comprises:
instructions, when executed, direct the at least one processor of the computing device to:
determine a geospatial position of the object of interest based on the geospatial intersection at which the correlated detections intersect.

19. The computer-readable medium of claim 15, wherein the determination of the attribute of the object of interest based on the correlated detections comprises:
instructions, when executed, direct the at least one processor of the computing device to:
determine a consistency or an inconsistency across the correlated detections; and
determine the attribute of the object of interest based on the consistency or the inconsistency across the correlated detections.

20. The computer-readable medium of claim 19, the determination of the attribute of the object of interest based on the correlated detections comprises:
instructions, when executed, direct the at least one processor of the computing device to:
determine a consistency or an inconsistency between a detection included in the correlated detections and geospatial data accessed from data source other than the set of images of the geospatial location; and
determine the attribute of the object of interest based on the consistency or the inconsistency between the detection and the geospatial data accessed from the data source other than the set of images of the geospatial location.

* * * * *